US009712218B2

(12) United States Patent
Singh (10) Patent No.: US 9,712,218 B2
(45) Date of Patent: Jul. 18, 2017

(54) METHOD AND APPARATUS FOR FACILITATING HIGH DATA RATE TRANSMISSION IN THE WIRELESS COMMUNICATION

(71) Applicant: Samsung Electronics Co., Ltd., Suwon-si, Gyeonggi-do (KR)

(72) Inventor: Jaspreet Singh, Richardson, TX (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/537,759

(22) Filed: Nov. 10, 2014

(65) Prior Publication Data

US 2016/0028454 A1 Jan. 28, 2016

Related U.S. Application Data

(60) Provisional application No. 62/029,879, filed on Jul. 28, 2014.

(51) Int. Cl.
*H04B 7/0456* (2017.01)
*H04B 1/3827* (2015.01)
(Continued)

(52) U.S. Cl.
CPC ......... *H04B 7/0456* (2013.01); *H04B 1/3827* (2013.01); *H04L 25/0224* (2013.01);
(Continued)

(58) Field of Classification Search
None
See application file for complete search history.

(56) References Cited

U.S. PATENT DOCUMENTS 6,864,817 B1 3/2005 Salvi et al.
2006/0128318 A1\* 6/2006 Agarossi ............... H04L 1/0003
455/69
(Continued)

OTHER PUBLICATIONS

International Search Report dated Nov. 12, 2015 in connection with International Application PCT/KR2015/007830; 4 pages.
(Continued)

*Primary Examiner* — Alejandro Rivero (57) ABSTRACT

A method for a wireless device capable of receiving and transmitting a signal includes receiving a reference signal from a second wireless device through a communication channel, estimating the communication channel, using the reference signal, selecting a pair of an analog digital converter (ADC) quantizer and an input distribution, based on the estimated communication channel, and sending information on the selected input distribution and the ADC quantizer to the second wireless device. A wireless device capable of wirelessly receiving and transmitting a signal includes a transceiver configured to receive a reference signal from a second wireless device through a communication channel, and a processor configured to estimate the communication channel, using the reference signal, selecting a pair of an ADC quantizer and an input distribution, based on the estimated communication channel, and sending information on the selected input distribution and the ADC quantizer to the second wireless device.

19 Claims, 8 Drawing Sheets

(51) Int. Cl.
*H04W 52/02* (2009.01)
*H04L 25/02* (2006.01)
*H04B 1/00* (2006.01)
*H04L 27/26* (2006.01)

(52) U.S. Cl.
CPC ....... *H04W 52/0212* (2013.01); *H04B 1/0007* (2013.01); *H04L 27/2647* (2013.01); *Y02B 60/50* (2013.01)

(56) References Cited

U.S. PATENT DOCUMENTS

| | | | | |
|---|---|---|---|---|
| 2008/0107193 | A1* | 5/2008 | Erceg | H04B 7/0417 375/260 |
| 2010/0014500 | A1* | 1/2010 | Lee | H04L 1/0017 370/342 |
| 2010/0202493 | A1 | 8/2010 | Soliman et al. | |
| 2010/0233967 | A1* | 9/2010 | Kim | H04L 1/0023 455/67.13 |
| 2011/0122787 | A1 | 5/2011 | Wang et al. | |
| 2012/0314676 | A1* | 12/2012 | Koo | H04B 7/0452 370/329 |
| 2013/0003789 | A1 | 1/2013 | Eom et al. | |
| 2013/0273930 | A1 | 10/2013 | Damnjanovic et al. | |
| 2014/0269627 | A1* | 9/2014 | Gorokhov | H04W 72/0446 370/336 |

OTHER PUBLICATIONS

Written Opinion dated Nov. 12, 2015 in connection with International Application PCT/KR2015/007830; 9 pages.
Extended European Search Report dated Nov. 30, 2015 in connection with European Application No. 15178540.9; 7 pages.
Singh, et al.; "On the Limits of Communication with Low-Precision Analog-to-Digital Conversion at the Receiver"; IEEE Transactions on Communication, vol. 57, No. 12; Dec. 2009; 11 pgs.

* cited by examiner

*Overall Channel (including ADC quantizer)*

METHOD AND APPARATUS FOR FACILITATING HIGH DATA RATE TRANSMISSION IN THE WIRELESS COMMUNICATION

CROSS-REFERENCE TO RELATED APPLICATION AND CLAIM OF PRIORITY

The present application claims priority to U.S. Provisional Patent Application Ser. No. 62/029,879, filed Jul. 28, 2014, entitled "METHODS TO FACILITATE HIGH DATA RATE TRANSMISSION IN ADC LIMITED COMMUNICATION TRANSCEIVER". The content of the above-identified patent document is incorporated herein by reference.

TECHNICAL FIELD

The present application relates generally to method and apparatus for facilitating high data rate transmission in the wireless communication and, more specifically, to select a input distribution and a ADC quantizer for a wireless communication transceiver

BACKGROUND

The field of communication has witnessed a great revolution over the past two decades. In particular, there has been remarkable growth in wireless communications, ranging from cellular communication to wireless local area networks. This growth has been propelled by the continuous exponential advances in computing hardware, popularly referred to as the Moore's "law", which has enabled integrated circuit implementation of sophisticated digital signal processing (DSP) algorithms. Future communication system designs are expected to continue riding the Moore's law to build low-cost low-power DSP-centric transmitter/receiver (transceiver) architectures.

Next generation wireless communication systems target data rates that are orders of magnitude (tens of Gbits/sec) larger than those offered by current systems. One way to achieve these high data rates is to scale up the system bandwidth, for example, using the wide swaths of spectrum available in the millimeter (mm) wave band. While offering the potential to provide drastically increased data rates, the design of such high bandwidth systems imposes several challenges. A particular one is the bottleneck imposed by the ADC technology: high-speed high-precision ADCs are either not available, or are prohibitively costly and power hungry. Recent state-of-the-art surveys indicate, for instance, that ADCs that can sample at rates in Giga-sample/s, with a (relatively modest) precision of 6-8 bits, have power consumption of the order of several hundred milliwatts. This potentially makes the ADC one of the most dominant power consumption modules in the entire receiver processing chain.

Given the preceding constraints imposed by evolution of the ADC technology, it is important to consider communication system and algorithm design towards alleviating the ADC bottleneck. This can be achieved by considering the use of low-precision ADCs (e.g., 1-4 bits). This drastic reduction of the ADC precision, however, significantly impacts the performance of the communication link. In particular, use of existing principles and designs for communication systems, in conjunction with low-precision ADC, results in severe performance degradation. Consequently, it is important to consider novel design principles for reliable communication system performance with low-precision ADC.

SUMMARY

In a first embodiment, a method for a wireless device capable of wirelessly receiving and transmitting a signal is provided. The method includes receiving a pilot or reference signal from a second wireless device through a communication channel. The method also includes estimating the communication channel, using the reference signal. The method further includes selecting a pair of an analogue digital converter (ADC) quantizer and an input distribution, based on the estimated communication channel.

In a second embodiment, a method for a wireless device capable of wirelessly receiving and transmitting a signal is provided. The method includes transmitting a pilot or reference signal to a second wireless device. The method also includes in response to the second wireless device estimating a communication channel based on the reference signal, and selecting a pair of an analogue digital converter (ADC) quantizer and the input distribution based on the estimated communication channel, receiving the selected input distribution from the second wireless device.

In a third embodiment, a wireless device capable of wirelessly receiving and transmitting a signal is provided. The wireless device includes a transceiver configured to receive a pilot or reference signal from a second wireless device through a communication channel. The wireless device includes a processor configured to estimate the communication channel, using the reference signal, and select a pair of an analogue digital converter (ADC) quantizer and an input distribution, based on the estimated communication channel.

In a fourth embodiment, a wireless device capable of wirelessly receiving and transmitting a signal is provided. The wireless device includes a transceiver configured to receive a reference signal from a second wireless device through a communication channel. The wireless device also includes a processor configured to transmit, via the transceiver, a reference signal to a second wireless device; and in response to the wireless device estimating a communication channel based on the reference signal, and selecting a pair of an analogue digital converter (ADC) quantizer and the input distribution based on the estimated communication channel, receive the selected input distribution from the second wireless device.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Figure 1:
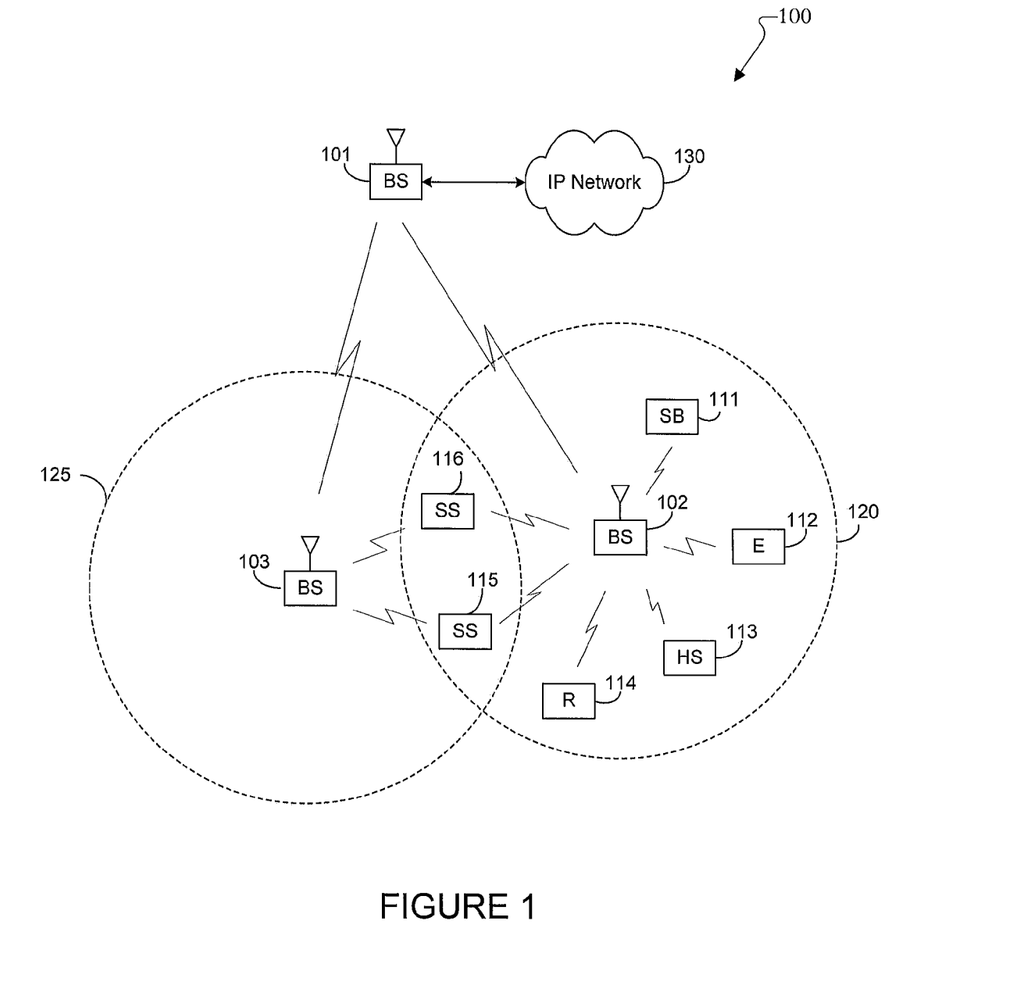
FIG. 1 illustrates an exemplary wireless system which transmits messages according to this disclosure.
Figure 2A:
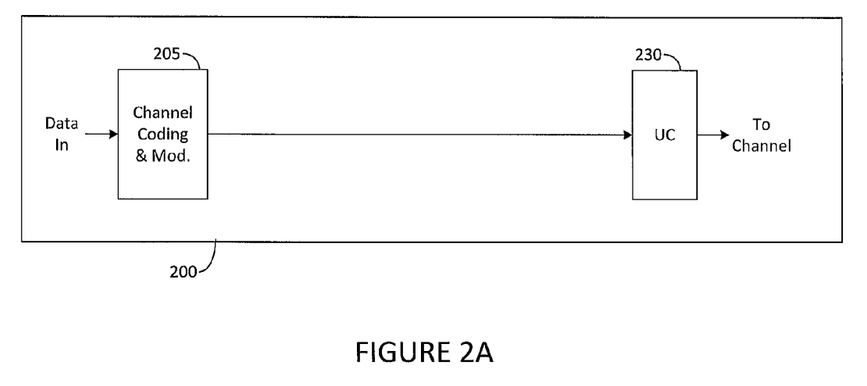
FIG. 2A illustrates a high-level diagram of a transmit path according to this disclosure.
Figure 2B:
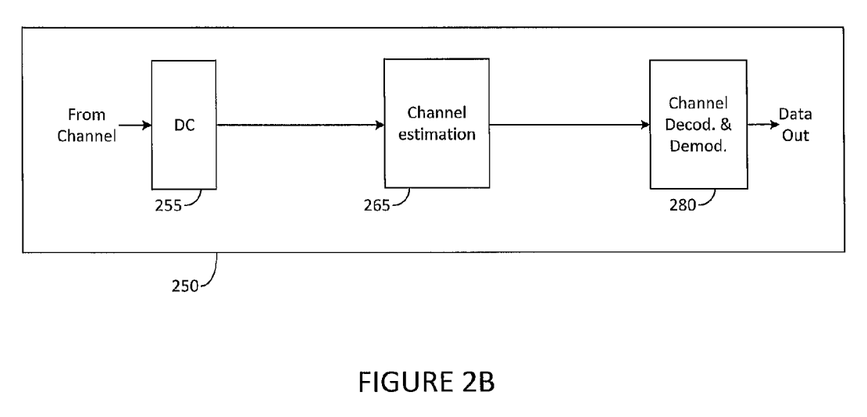
FIG. 2B illustrates a high-level diagram of a receive path according to this disclosure.
Figure 3:
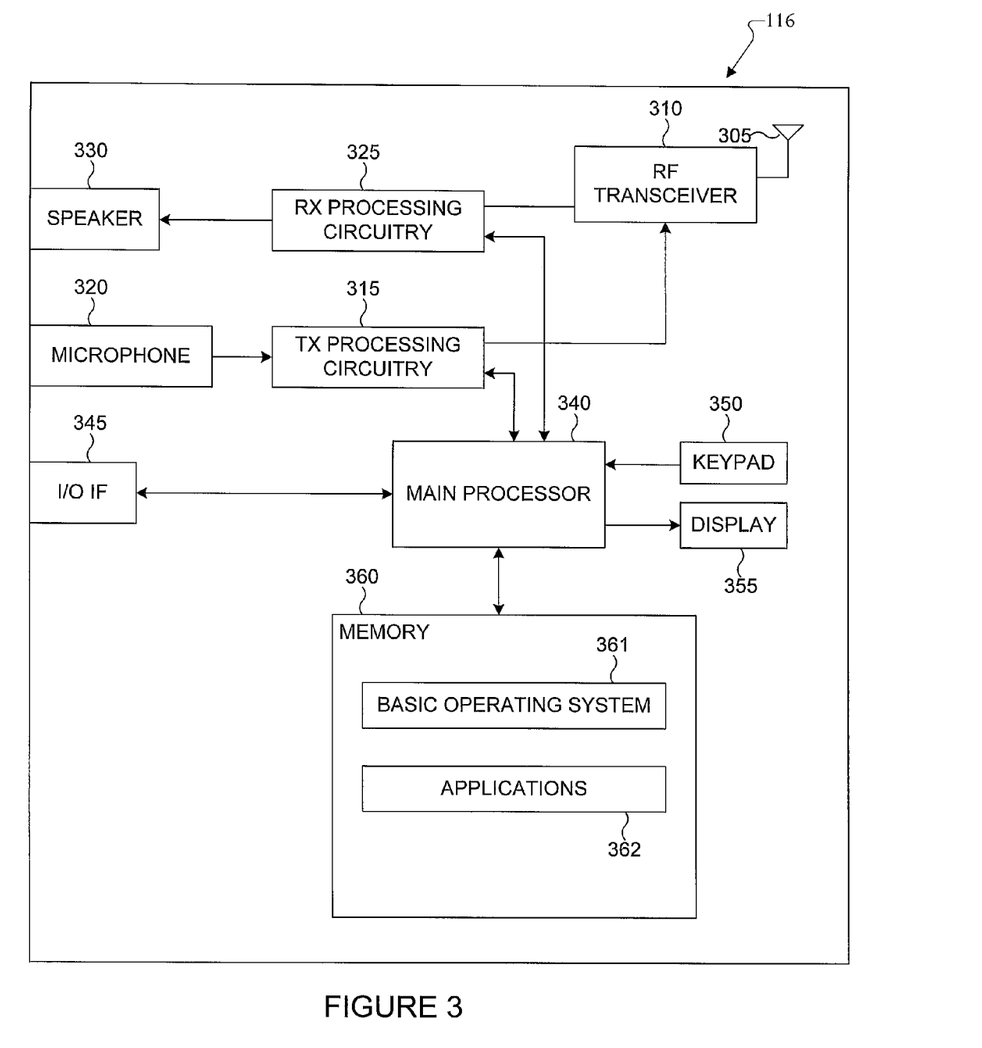
FIG. 3 illustrates a high-level diagram of a user equipment device.

FIGS. 1-3 below describe various embodiments implemented in wireless communications systems and with the use of ONDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R), which may be a mobile device (M) like a cell phone, a wireless laptop, a wireless PDA, or the like; and a Machine-Type Communication (MTC) UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the MTC UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, one or more of eNB 101, eNB 102 and eNB 103 are configured to perform or support high data rate transmissions according to embodiments of the present disclosure. More specifically, one or more of eNB 101, eNB 102 and eNB 103 include processing circuitry including one or more processors, or a processor array, or a controller, coupled to one or more transceivers to support the high data rate transmissions as described herein.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as MTC UE 116). However, it will be understood that the receive path 250 could be implemented in an eNB and that the transmit path 200 could be implemented in a UE. In some embodiments, the transmit path 200 and receive path 250 are configured to perform or support high data rate transmissions according to embodiments of the present disclosure.

The transmit path 200 includes a channel coding and modulation block 205, and an up-converter (UC) 230. The receive path 250 includes a down-converter (DC) 255, a channel estimation block 265, and a channel decoding and demodulation block 280. In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of symbols to be transmitted (i.e., the signal to be transmitted). The up-converter 230 modulates (such as up-converts) the signal to an RF frequency for transmission via a wireless channel. The signal may also be filtered at baseband before conversion to the RF frequency.

A transmitted RF signal from the eNB 102 arrives at the MTC UE 116 after passing through the wireless channel, and reverse operations to those at the eNB 102 are performed at the MTC UE 116. The down-converter 255 down-converts the received signal to a baseband frequency. The channel estimation block estimates the wireless channel (e.g., based on some pilot symbols sent from the transmitter). The channel decoding and demodulation block 280 demodulates and decodes the modulated symbols to recover the original input data stream.

Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components can be implemented by configurable hardware or a mixture of software and configurable hardware.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for performing or supporting high data rate transmissions according to embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
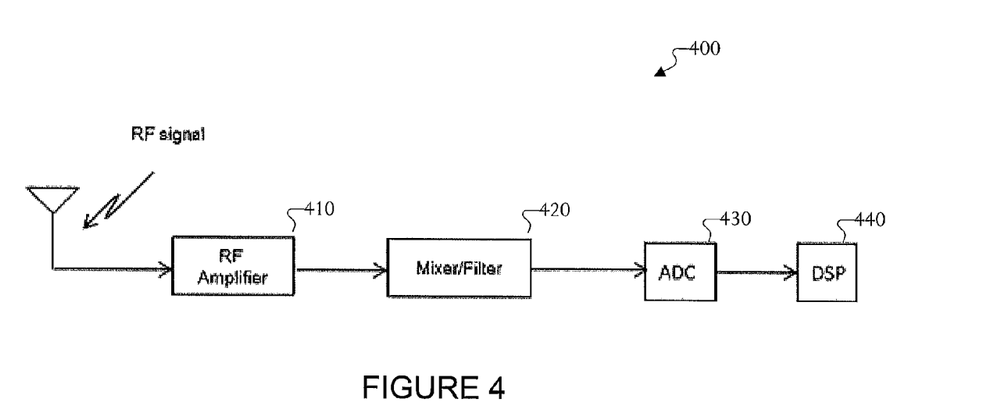
FIG. 4 illustrates a DSP-centric receiver architecture according to this disclosure.

FIG. 4 illustrates, at a high-level, a DSP-centric receiver architecture 400 (e.g., architecture for a UE) according to this disclosure. The embodiment of the DSP-centric receiver 400 shown in FIG. 4 is for illustration only. Other embodiments could be used without departing from the scope of the present disclosure. The RF amplifier (such as a low noise amplifier) amplifies the received signal. The mixer/filter block shown in FIG. 4 performs the down conversion operation discussed in reference to FIG. 2B.

A central component of DSP-centric receiver architectures is the analog-to-digital converter (ADC), which converts the received analog waveform into the digital domain. The ADC samples the analog waveform, and quantizes each sample with a certain bit-precision (i.e. resolution). To minimize the information loss incurred in the process of quantization, the ADC should quantize each sample with high precision. Typically, ADCs with quantization precision of 12-14 bits are employed for communication receivers. Once the received signal is sampled by the ADC, receiver operations such as channel estimation, synchronization, demodulation and decoding are performed using digital signal processing (DSP).

Typically, the design of communication systems is performed without taking the ADC quantization effects into account. Mostly, simulation studies are used to study the impact of ADC quantization while implementing digital signal processing algorithms. With low-precision ADCs, as discussed herein, the preceding design paradigm does not apply, as the ADC must be a part of the design process. The methods disclosed herein, which take into account the ADC quantization while designing the communication system, are therefore distinct from existing systems.

One related approach was disclosed by J. Singh, O. Dabeer and U. Madhow, "On the limits of communication with low-precision analog-to-digital conversion at the receiver," IEEE Transactions on Communications, Vol. 57, No. 12, pp. 3629-3639, December 2009, where the ADC quantization is incorporated into the study of modulation and quantizer optimization. This article is incorporated into this disclosure by reference in its entirety. However, the method in the article is limited to the ideal setting of an additive white Gaussian channel (no channel dispersion, and perfect time/frequency/phase synchronization). In practice, the transmitted signal also undergoes several distortions. This requires development of new methods for modulation and quantizer selection, and their feedback, as disclosed here. This disclosure discloses several novel methods for facilitating high data rate transmission in ADC limited communication systems. In particular, methods are disclosed for optimal selection, and feedback, of the transmission modulation and ADC quantizer in practical communication scenarios.

Figure 5:
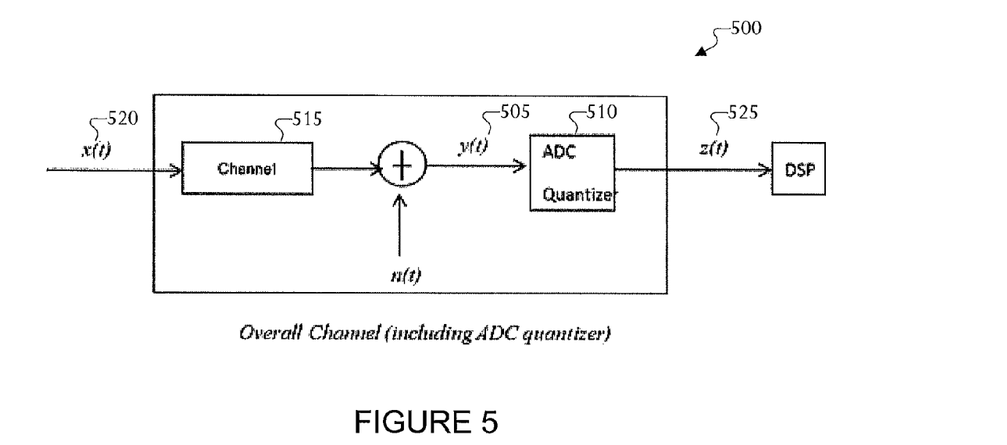
FIG. 5 illustrates a channel model incorporating the ADC quantizer according to this disclosure.

FIG. 5 illustrates the channel model incorporating the ADC quantizer according to this disclosure. The embodiment of the channel model 500 shown in FIG. 5 is for illustration only. Other embodiments could be used without departing from the scope of the present disclosure.

For explaining the methods disclosed here, the following exemplary communication channel model is provided, according to Equation 1:

$$y(t)=h(t)x(t)+n(t) \qquad (1)$$

where t is the time index, x(t) is the complex baseband transmitted symbol, y(t) is the complex baseband received symbol, and, n(t) is additive complex Gaussian noise. The channel coefficient h(t) is an unknown complex Gaussian random variable, which models, for example, a typical wireless communication setting where the received signal undergoes fading.

For the systems in which the ADC is not a bottleneck, the preceding model is employed for system design and development. However, for ADC limited systems, the ADC can also be incorporated as a part of the system design. This is achieved by working with the following complex baseband channel model, as shown in Equation 2:

$$z(t)=Q_t(y(t))=Q_t(h(t)x(t)+n(t)) \qquad (2)$$

where $Q_t$ denotes the ADC quantization operation at time t.

The quantization operation converts the analog received signal y(t) 505 into a digitized sample. For L-bin quantization, the quantizer output is one out of L indices, such as, $z(t) \in \{1, 2, \ldots, L\}$. Note that y(t) 505 is a complex baseband signal, so that $Q_t$ denotes a quantization operation on a complex symbol. In practice, this can be implemented by applying separate quantization on the real and imaginary parts (namely, separate quantization of the in-phase (I) and quadrature-phase (Q) components of y(t)), or otherwise.

For L-bin quantization, the quantizer converts the analog signal to one of out L possible output values. Specifying the quantizer 510 is therefore equivalent to specifying a partitioning of the incoming symbol space into L regions. Here, with y(t) 505 being a complex valued analog signal, an L-bin quantizer partitions the space of all complex valued numbers, denoted C, into L regions, so that specifying the quantizer is equivalent to specifying a partition of C into L regions. As an example, consider L=16, which can be implemented by employing 4-bin (i.e., 2-bit ADC) quantization on both the I and Q channel samples. A 2-bit ADC is specified by a set of three thresholds, so that in this case, the quantizer is specified by 3 thresholds each for the I and Q channels.

In case of a typical scenario of slow-varying channel, e.g., a channel 515 encountered in indoor wireless networks, the channel can be approximated to be constant over a certain duration of time (termed, channel coherence time). To explain the methods disclosed here, we drop, for the moment, the time index t, and write the channel model as in Equation 3:

$$z=Q(y)=Q(hx+n) \quad (3)$$

The achievable rate of transmission over this channel model 500 is given by the information-theoretic notion of Shannon capacity, which is defined to be maximum value of the mutual information between the channel input x 520, and the channel output z 525, with the maximization performed over the probability measure (probability distribution, or input distribution) of the channel input x 520. Note that, with the ADC quantizer 510 incorporated as a part of this channel 500, different choices of the quantizer result in a different channel model, so that the capacity is a function of the quantizer choice as well. To optimize the rate of data transmission, it is therefore desired to pick a quantizer that results in the maximum channel capacity.

Let the input-output mutual information be denoted as I(x; z), which is a function of the probability measure of the channel input, denoted F. To optimize the channel data rate, the following capacity is computed according to Equation 4:

$$C=\max_Q \max_F I(x;z). \quad (4)$$

The preceding optimization involves a maximization of the channel mutual information, over both, the input distribution, F, and the ADC quantizer, Q. Typically, the input distribution (i.e., input probability measure) is constrained to satisfy some moment limits, such as the second moment, or average power.

Note that the mutual information I (x; z) depends on the channel coefficient h, so that a different optimization is performed for different channel realizations. Further, note that, once the optimization is performed (by the transmitter, or the receiver), both the transmitter and the receiver should have knowledge of the optimized solution. The transmitter picks modulation symbols based on the optimized input probability measure, while the receiver uses the knowledge of the input probability measure, and the ADC quantizer, to perform reliable detection and decoding.

Figure 6:
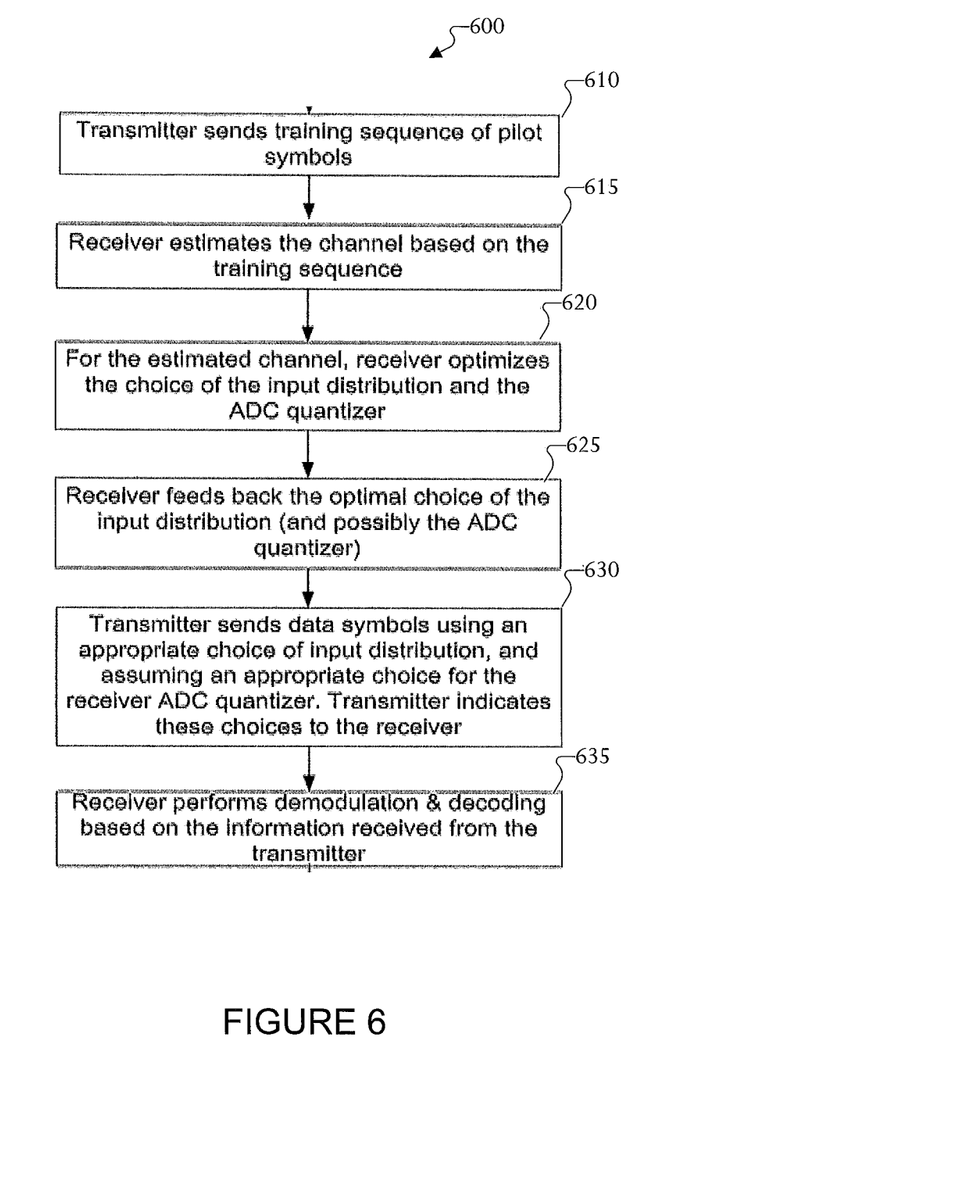
FIG. 6 illustrates a procedure for facilitating increased data rates in ADC limited transceivers according to this disclosure.

FIG. 6 illustrates a flowchart 600 for facilitating increased data rates in ADC limited transceivers in accordance with the present disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station or a base station.

A procedure to optimize the input distribution and the ADC quantizer, to enhance the link performance, can be as follows. The transmitter sends a training sequence of pilot or reference symbols in step 610, and the training sequence of pilot/reference symbols is used by the receiver to estimate the channel coefficient h in step 615. Based on the estimate, the receiver optimizes the choices of the input distribution and the ADC quantizer in a pair in step 620. In some embodiments, the choice of the input distribution can be, for example, a constellation of QPSK, 16QAM, or 64QAM, and the choice of the ADC quantizer can be, e.g., one of 4-bin, 8-bin, and 16-bin resolution.

The optimized choices of the input distribution, and possibly the ADC quantizer are fed back to the transmitter in step 625. The transmitter sends data symbols (while possibly performing channel encoding) using an appropriate input distribution (likely to be the input distribution indicated by the receiver), while also indicating explicitly the input distribution and possibly the ADC quantizer to be used by the receiver choices in step 630. The receiver decodes and demodulates the received data symbols based on the input distribution and ADC quantizer choice indicated by the transmitter in step 635.

In some embodiments, the transmitter can be bound to employ the input distribution suggested by the receiver. In these embodiments, the receiver does not need to indicate the ADC quantizer choice and the transmitter does not need to indicate the employed constellation, and the assumed receiver ADC quantizer.

In some embodiments, the transmitter is not bound to use the constellation suggested by the receiver. In these embodiments, it is preferred that the receiver indicates the optimal ADC quantizer choice, along with the constellation choice. The transmitter selects an appropriate pair of a constellation, and an ADC quantizer to use and indicates this pair of constellation and the assumed receiver's ADC quantizer to the receiver.

In another application scenario in which the transmitter can acquire channel estimates, such as the TDD system or a WiFi system, the transmitter performs the input distribution and ADC quantizer optimization. In such a system, the transmitter possesses the channel estimate based on pilot or other symbols that can be occasionally sent by the receiver, such as, in the uplink of a cellular communication system.

Figure 7:
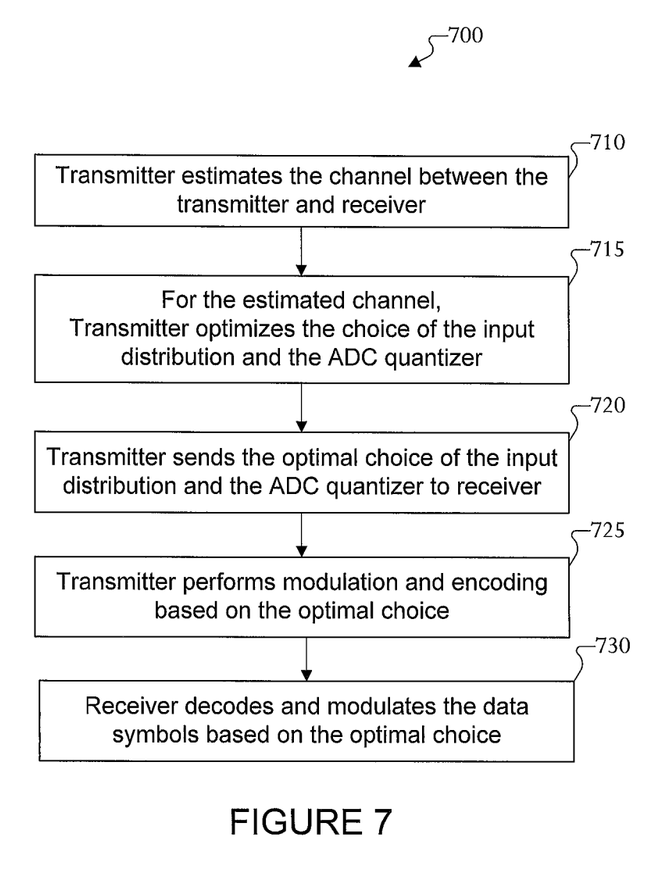
FIG. 7 illustrates a procedure for facilitating increased data rates in the transmitter according to this disclosure.

FIG. 7 illustrates a flowchart 700 for facilitating increased data rates in those systems where the transmitters possess the channel estimate, in accordance with the present disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station or a base station.

In the embodiments, the transmitter optimizes the input probability distribution and the ADC quantizer in the following procedure. In step 710, the transmitter estimates the communication channel coefficient h between the transmitter and receiver by using the pilot and/or reference symbols transmitted from the receiver.

Based on the estimate, the transmitter optimizes the choice of the input probability distribution and the ADC quantizer in step 715. The optimized choices of the input distribution and the ADC quantizer are communicated to the receiver in step 720.

The transmitter sends data symbols (while possibly performing channel encoding) using an appropriate input distribution (likely to be the optimal input distribution obtained in the preceding step), while also indicating explicitly the input distribution and possibly the ADC quantizer to be used by the receiver in step 725. The receiver decodes and demodulates the received data symbols based on the input distribution and ADC quantizer choice indicated by the transmitter in step 730.

Figure 8:
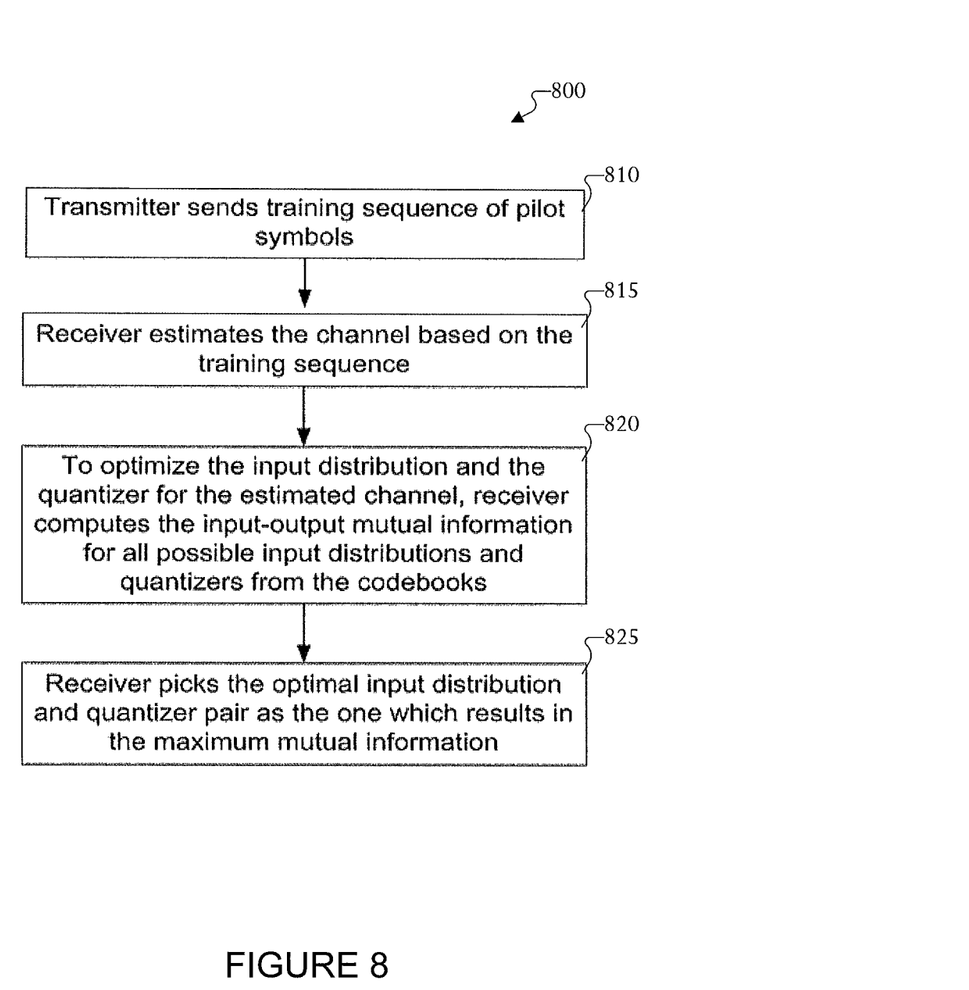
FIG. 8 illustrates a procedure for input distribution and ADC quantizer optimization with a limited feedback setting according to this disclosure.

FIG. 8 is a flowchart 800 for input distribution and ADC quantizer optimization with a limited feedback setting in association with the present disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station or a base station.

The feedback of the choice of the optimal input distribution and possibly the ADC quantizer from the receiver to the transmitter can be performed in various manners. In some embodiments, the transmitter and the receiver maintain a priori specified codebook of possible input distributions, namely, the set of all possible input distributions and possibly a codebook of possible ADC quantizers, for example, the set of all possible quantizer choices, in a memory. Instead of employing separate codebooks corresponding to the input distribution and the ADC quantizer, a joint codebook could also be employed, with a particular entry (and the corresponding index) specifying a combination of the input distribution and the ADC quantizer.

Based on a channel estimation obtained through steps 810 and 815, the receiver computes the input-output mutual information for all possible input distributions and ADC quantizers from the codebooks in step 820.

The receiver picks the optimal input distribution and quantizer pair as the one which results in the maximum mutual information in step 825. For example, for given codebooks of input distribution and ADC quantizer, the receiver can compute the input-output mutual information for all possible choices of the input distribution and the ADC quantizer. The input distribution and ADC quantizer combination that maximizes the mutual information can then be used as the optimal choice.

Then, the optimal input distribution and possibly the ADC quantizer choices are fed back in the form of indices. For example, the optimal input distribution could be indicated by the receiver to the transmitter as described above, via indicating an index, corresponding to one out of several possible choices of the input distribution. Similarly, the choice of the ADC quantizer could be indicated via an index corresponding to one out of several possible ADC quantizer choices.

The transmitter performs data transmission using a suitable input distribution choice, and possibly also assumes the use of a suitable ADC quantizer at the receiver for data demodulation and decoding. The transmitter could also indicate this eventual choice of the input distribution used for data modulation, and possibly the assumed choice of the ADC quantizer that would be used at the receiver, via a set of indices transmitted to the receiver.

In the application scenario in which the transmitter can acquire channel estimates, such as a TDD system or a WiFi system, the transmitter is configured to optimize the input distribution and ADC quantizer from the codebook(s). The transmitter also is configured to send an index indicating the optimized ADC quantizer to the receiver.

Figure 9:
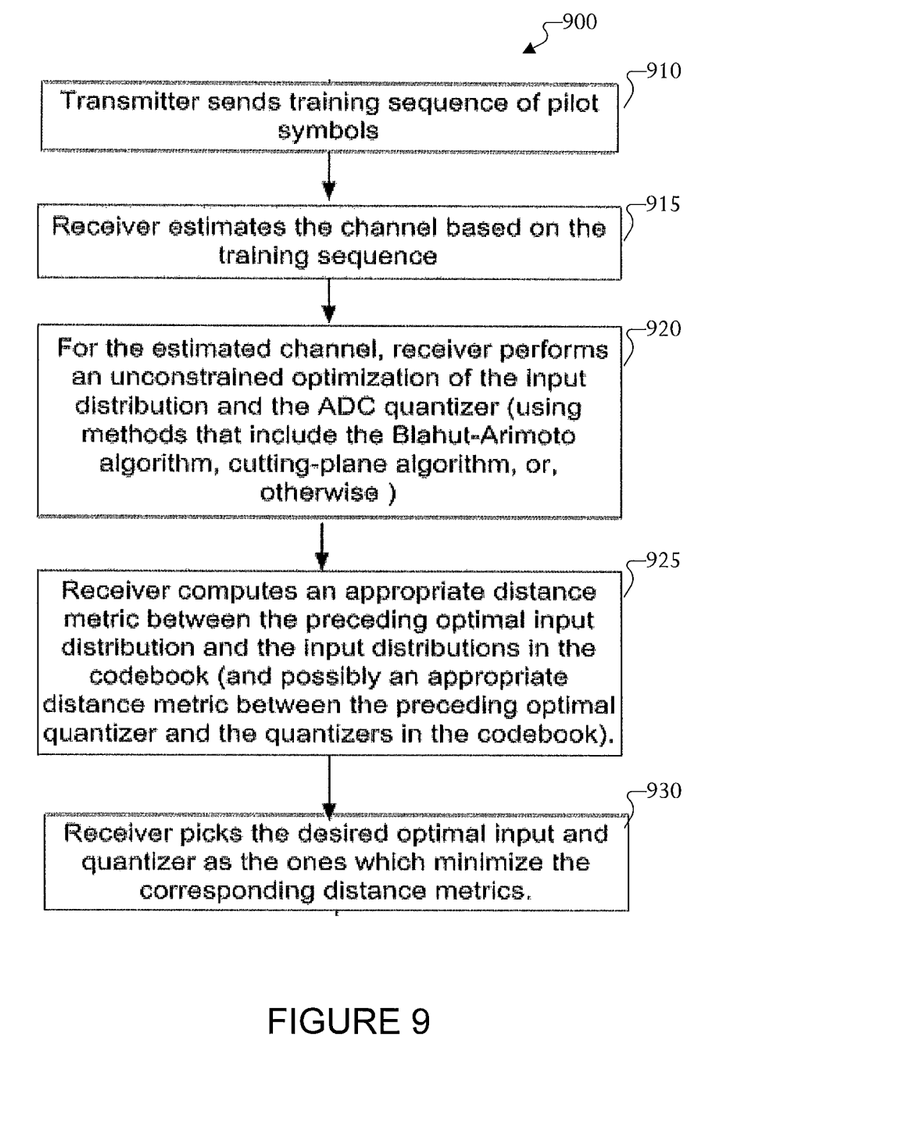
FIG. 9 illustrates another procedure for optimizing input distribution and ADC quantizer according to this disclosure.

FIG. 9 is another flowchart for optimizing input distribution and ADC quantizer in association with the present disclosure. While the signaling flow depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The process depicted in the example depicted is implemented by a transmitter chains in, for example, a mobile station or a base station.

In step 910, the transmitter sends a training sequence of pilot symbols to the receiver. In step 915, the receiver estimates the channel based on the training sequence. Once the channel estimation is obtained through steps 910 and 915, the receiver with a priori specified codebook of possible input distributions, can perform an unconstrained optimization without restricting the set of possible input distributions and the ADC quantizers to the specified codebooks in step 920. The unconstrained optimization over the input distribution and the ADC quantizer could be performed using procedures include, but are not limited to, the Blahut-Arimoto algorithm or the cutting-plane algorithm for optimizing the input distribution. Alternatively, while performing the optimization of the input distribution, it is possible that the number of mass points in the input distribution can be constrained. For example, it can be assumed that the input distribution contains at most as many mass points as the number of quantization bins. For optimizing the ADC quantizer, attention can possibly be restricted to symmetric quantizers (e.g., the sets of thresholds corresponding to the I and Q channels can be symmetric around the origin), or, uniform quantizers (e.g., the separation between consecutive thresholds for the I and Q channel ADCs can be constant), or otherwise.

In step 925, the receiver computes an appropriate distance metric between the preceding optimal input distribution and the input distributions in the codebook. This operation can include computing an appropriate distance metric between the preceding optimal quantizer and the quantizers in the codebook. The receiver performs a mapping of the resulting optimal solutions to the nearest entries in the specified codebooks, using an appropriately defined metric to measure the distance between two input distributions, such as the relative entropy, or otherwise, and an appropriately defined metric to measure the distance between two ADC quantizers. Then, in step 930, the receiver sends the optimal choice of the input distribution and the ADC quantizer to the transmitter.

In an alternate approach, the receiver could estimate the channel, and map the channel estimate to an index (i.e., obtain a quantized estimate of the channel). This index can then be mapped to one of the entries of the a priori specified codebook of input distribution and one of the entries of the codebook of ADC quantizers. That is, the codebooks of the input distribution and the ADC quantizer are designed so as to contain the optimal choices for a set of quantized channel estimates.

In the application scenario in which the transmitter can acquire channel estimates, such as a TDD system or a WiFi system, the transmitter is configured to perform the constrained or unconstrained optimization for the input distribution and ADC quantizer choice. The transmitter also is configured to send an index indicating the optimized ADC quantizer to the receiver.

In some embodiments, the receiver feeds back the channel coefficient (possibly a quantized channel coefficient, indicated via a sequence of bits), and the transmitter performs the optimization of the input distribution and the ADC quantizer. Subsequently, the transmitter would convey the choice of the input distribution used for data modulation, and the suggested ADC quantizer choice, to the receiver. As in the preceding embodiments, the transmitter and the receiver would require to maintain a set of common codebooks for the possible input distributions and the possible ADC quantizers.

The procedures for optimizing input distribution and ADC quantizer as discussed above can be applied to a multi-path channel model and a multiple input multiple output (i.e., MIMO) channel model. In some embodiments, a multipath channel model is utilized wherein the signal sent by the transmitter is received via a number of paths. A suitable channel model, considering the received sample at sampling instant time m, is according to Equation 5:

$$z[m]=Q(y[m])=Q(\Sigma_{i=0}^{i=L-1}h_i x[m-i]+n[m]), \quad (5)$$

where $H:=\{h_i;\ 0\leq l\leq L-1\}$ denotes the multipath channel, consisting of L multipath components. The model applies, in general, for any channel with memory. All the methods disclosed in the preceding embodiments (which can be viewed as a multipath channel with L=1), apply for the setting of a multipath channel described here as well. For a multipath channel, the receiver's estimate of the channel, based on the pilot symbols sent by the transmitter, is an estimate of the set of channel coefficients H. Based on the estimation of H, the receiver (or the transmitter) performs an optimization of the input distribution and the ADC quantizer, and feeds back the optimal choices of the input distribution and possible the ADC quantizer to the transmitter (or the receiver).

In some embodiments, a multiple input multiple output (i.e., MIMO) channel model is utilized, obtained by the use of multiple antennas at the transmitter and the/or receiver. Generalizing the single input single output (SISO) channel model of Equation 3, we can express a MIMO channel as follows. Without considering the ADC quantization, for the moment, the MIMO channel is expressed as shown in Equation 6:

$$y=HPx+n; \quad (6)$$

where H is a $N_R \times N_T$ matrix (with $N_R$ being the number of receiver antennas, and $N_T$ being the number of transmitter antennas), P is a $N_T \times N_S$ transmit precoder (with $N_S$ being the number of transmitted data streams), x is the $N_S \times 1$ vector of transmitted symbols, and y is the $N_R \times 1$ vector of received symbols, and n is a $N_R \times 1$ vector of additive noise. The quantized MIMO channel can then be represented as in Equation 7:

$$z_r Q_r(y_r); 1 \leq r \leq N_R; \quad (7)$$

with $z_r$ denoting the quantized symbol at the receiver antenna r, and $Q_r$ denoting the ADC quantizer employed at the receiver antenna r. The methods disclosed in the preceding embodiments for the SISO channel, can now be extended to apply for the MIMO channel. Specifically, for the MIMO channel operation, the receiver first estimates the MIMO channel matrix H based on the pilot symbols sent by the transmitter. Using the estimate of H, the receiver then optimizes the choice of the constellation (namely, the input distribution) to be employed for different data streams, as well as the choice of the ADC quantizer to be employed at the different receiver antennas. These choices are indicated to the transmitter via feedback, as in the SISO channel operation.

It should be noted that the optimization criterion for the MIMO channel can be the mutual information between the channel input vector x and the quantized channel output vector $z=z_1, z_2, \ldots, z_{N_R}$). A different optimization can be performed for different choices of the transmit precoder P, which can also be picked from a codebook of possible precoders, essentially resulting in a joint optimization of the input distributions, ADC quantizers, and the precoder.

In a slow-varying channel model, the channel is assumed to remain approximately constant for a certain time duration, over which the receiver estimates the channel, optimizes the input distribution and ADC quantizer, which are subsequently employed for data modulation and/or coding and demodulation and/or decoding. In a fast-varying channel model, the channel changes significantly from one sampling time instant to another. In this scenario, it is not possible to tolerate the delays encountered in the procedure (e.g., feedback of information from receiver to transmitter incurs delay). For fast fading scenario, on the other hand, the input and ADC quantizer optimization could be performed, under an assumption on the distribution of the channel coefficients.

For instance, consider the channel model in Equation 3. Assuming a certain statistical distribution for the channel coefficient h, (the distribution could, in general, be available based on channel measurements), the transition probability of this channel (namely, the probability of obtaining a certain output symbol, given a certain input symbol) can be obtained. Using this transition probability, an optimization over the channel input distribution and the ADC quantizer can be performed. Data modulation/encoding at the transmitter, and demodulation/decoding at the receiver can then be performed based on the optimized choices of the input distribution and the ADC quantizer.

In (all or many) of the preceding embodiments, an additional step can be included, possibly at the beginning. This step can include a receiver capability negotiation/exchange. For instance, there can be exchange of information on the number of bits used employed by the receiver's ADC. This may be indicated, for example, by the receiver to the transmitter at the time of initial network entry. Different receivers may be classified into different categories based on their ADC precision, and the input distribution and/or ADC quantizer codebooks discussed in the preceding embodiments may depend on the receiver category.

While the preceding embodiments have been disclosed in the context of a single-carrier system, the principles disclosed can be applied to multi-carrier systems as well, such as orthogonal frequency division multiplexing (OFDM) based systems. In such systems, the optimization of the input distribution and the ADC quantizer may be performed in different manners. For instance, for wideband transmission (one common input distribution across all subcarriers used for transmission), a joint optimization of the input distribution and the ADC quantizer would be performed considering the (estimated) channel across all subcarriers. The optimization criterion used could be the sum (or average) mutual information across all subcarriers. In subband based transmission (where different input distributions may be used across different subbands of carriers), a joint optimization could be performed over the input distributions used across the subbands and the receiver ADC quantizer (again, using the sum or average mutual information across all subcarriers as the optimization metric.)

The existing and prior technologies are not expected to work well in the system disclosed herein, where the ADC has a low precision. The methods and apparatuses disclosed herein are specifically designed to provide significantly enhanced link performance in the face of drastic receiver quantization. Without these techniques, the communication link performance degrades to a large extent. Enhanced communication performance in systems with low-precision ADC is especially important for next generation communication systems that target increased data rates at reduced power consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a wireless multiple input multiple output (MIMO) device capable of wirelessly receiving and transmitting a plurality of data streams, the method comprising:
   receiving pilot or reference signals from a second wireless MIMO device for a plurality of communication channels, wherein the data streams are transmitted through the communication channels, respectively;
   estimating the communication channels, using the reference signals or the pilot signals; and
   determining, based on the estimated communication channels, pairs of an analogue digital converter (ADC) quantizer and an input distribution for each of the data streams,
   wherein the input distribution is a probability measure of channel input data, and is determined based on the estimated communication channels,
   wherein the pairs of an ADC quantizer and an input distribution for each of the data streams are optimized to maximize a throughput in each of the estimated communication channels.

2. The method of claim 1, further comprising:
   sending information on the pairs of an ADC quantizer and an input distribution for each of the data streams to the second wireless MIMO device.

3. The method of claim 1, wherein the wireless MIMO device and the second wireless MIMO device maintain a common codebook comprising a set of a plurality of input distributions and a set of a plurality of quantizer choices, and the wireless MIMO device selects the pairs of the ADC quantizer and an input distribution for each of the data streams from the common codebook, and sends indexes indicating the pairs of an input distribution for each of the data streams to the second wireless MIMO device.

4. The method of claim 1, wherein the wireless MIMO device computes achievable throughput for a plurality of choices of the pairs of an input distribution and an ADC quantizer from a codebook, to make a selection.

5. The method of claim 1, wherein the wireless MIMO device performs unconstrained optimizations for the pairs of an input distribution and an ADC quantizer for each of the data streams, and maps the optimized pairs of an input distribution and an ADC quantizer for each of the data streams to a nearest input distribution and ADC quantizer in a codebook.

6. The method of claim 1, wherein the wireless MIMO device optimizes the pairs of an input distribution to be employed for different data streams and an ADC quantizer to be employed at different wireless MIMO device antennas, and a MIMO precoder to be employed at the wireless MIMO device and the second wireless MIMO device.

7. A method of operating a wireless multiple input multiple output (MIMO) device capable of wirelessly receiving and transmitting a plurality of data streams, the method comprising:
   transmitting pilot or reference signals to a second wireless MIMO device for a plurality of communication channels, wherein the data streams are transmitted through the communication channels, respectively; and
   in response to the second wireless MIMO device estimating each communication channel based on the pilot or the reference signals and determining, based on each estimated communication, pairs of an analogue digital converter (ADC) quantizer and an input distribution for each of the data streams based on the estimated communication channels, receiving the pairs of an input distribution and an ADC quantizer for each of the data streams from the second wireless MIMO device,
   wherein the input distribution is a probability measure of channel input data, and is determined based on the estimated communication channels,
   wherein the pairs of an ADC quantizer and an input distribution for each of the data streams are optimized to maximize a throughput in each of the estimated communication channels.

8. The method of claim 7, wherein:
   after receiving the pairs of an input distribution and an ADC quantizer from the second wireless MIMO device, the wireless MIMO device selects input distributions in the pairs to modulate each data stream to be sent to the second wireless MIMO device, and indicates the pairs of an input distribution and an ADC quantizer to the second wireless MIMO device.

9. The method of claim 8, wherein:
   the wireless MIMO device adopts input distributions in the pairs to modulate each data stream to be sent to the second wireless MIMO device.

10. A method of operating a wireless multiple input multiple output (MIMO) device capable of wirelessly receiving and transmitting a plurality of data streams, the method comprising:
    receiving pilot or reference signals from a second wireless MIMO device for a plurality of communication channels, wherein the data streams are transmitted through the communication channels, respectively; and
    estimating the communication channels based on the reference signal or the pilot signals, and based on the estimated channels,
    determining, based on the estimated communication channels, pairs of an input distribution for transmission and an analogue to digital converter (ADC) for each of the data streams to be used by the second wireless MIMO device, and
    sending information on the pairs of an input distribution and an ADC quantizer for each of the data streams to the second wireless MIMO device,
    wherein the input distribution is a probability measure of channel input data, and is determined based on the estimated communication channels, wherein the pairs of an ADC quantizer and an input distribution for each of the data streams are optimized to maximize a throughput in each of the estimated communication channels.

11. A wireless multiple input multiple output (MIMO) device capable of wirelessly receiving and transmitting a plurality of data streams, the wireless MIMO device comprising:
a transceiver configured to receive pilot or reference signals from a second wireless MIMO device for a plurality of communication channels, wherein the data streams are transmitted through the communication channels, respectively; and
a processor configured to:
estimate the plurality of the communication channels, using the reference signals or the pilot signals; and
determine, based on the estimated communication channels, pairs of an analogue digital converter (ADC) quantizer and an input distribution for each of the data streams,
wherein the input distribution is a probability measure of channel input data, and is determined based on the each estimated communication channels,
wherein the pairs of an ADC quantizer and an input distribution for each of the data streams are optimized to maximize a throughput in each of the estimated communication channels.

12. The wireless MIMO device of claim 11, wherein the processor is further configured to send information on the pairs of an input distribution, and an ADC quantizer, to the second wireless MIMO device via the transceiver.

13. The wireless MIMO device of claim 11, wherein the processor is further configured to:
maintain a common codebook comprising a set of a plurality of input distributions and a set of a plurality of ADC quantizer choices from a memory, wherein the second wireless MIMO device is configured to share the common codebook;
select the pairs of an input distribution and the ADC quantizer from the common codebook; and send indexes indicating input distributions in the pairs to the second wireless MIMO device.

14. The wireless MIMO device of claim 11, wherein the processor is further configured to compute achievable throughputs for a plurality of choices of pairs of an input distribution and an ADC quantizer from a codebook, to make a selection.

15. The wireless MIMO device of claim 11, wherein the processor is further configured to:
perform an unconstrained optimization for the pairs of an input distribution and an ADC quantizer for each of the data streams; and map each optimized pair of an input distribution and an ADC quantizer to a nearest input distribution and ADC quantizer in a codebook.

16. The wireless MIMO device of claim 11, wherein the processor is further configured to optimize the pairs of the input distribution to be employed for different data streams and the ADC quantizer to be employed at different wireless MIMO device antennas, and a MIMO precoder to be employed at the wireless MIMO device and the second wireless MIMO device.

17. A wireless multiple input multiple output (MIMO) device capable of wirelessly receiving and transmitting a plurality of data streams, the wireless MIMO device comprising:
a transceiver configured to wirelessly communicate with a second wireless MIMO device through a plurality of communication channels, wherein the data streams are transmitted through the communication channels, respectively; and
a processor configured to:
transmit, via the transceiver, reference or pilot signals to the second wireless MIMO device; and
in response to that the second wireless MIMO device estimates the communication channels based on the pilot or the reference signals, and determines, based on the estimated communication channels, pairs of an analogue digital converter (ADC) quantizer and an input distribution for each of the data streams, receive the pairs of the input distribution and the ADC quantizer for each of the data streams from the second wireless MIMO device,
wherein the input distribution is a probability measure of channel input data, and is determined based on the estimated communication channels,
wherein the pairs of an ADC quantizer and an input distribution for each of the data streams are optimized to maximize a throughput in each of the estimated communication channels.

18. The wireless MIMO device of claim 17, wherein the processor is further configured to:
after receiving the pairs of an input distribution and an ADC quantizer from the second wireless MIMO device, indicate the pairs of an input distribution and an ADC quantizer to the second wireless MIMO device.

19. The wireless MIMO device of claim 18, wherein:
the wireless MIMO device is configured to adopt input distributions in the pairs to modulate each data stream to be sent to the second wireless MIMO device.

* * * * *